(12) United States Patent
Steinhauer

(10) Patent No.: US 8,775,555 B2
(45) Date of Patent: Jul. 8, 2014

(54) REST INTERFACE INTERACTION WITH EXPECTATION MANAGEMENT

(75) Inventor: Sebastian Steinhauer, Santa Clara, CA (US)

(73) Assignee: SAP AG, Walldorf (DE)

( * ) Notice: Subject to any disclaimer, the term of this patent is extended or adjusted under 35 U.S.C. 154(b) by 143 days.

(21) Appl. No.: 13/106,878

(22) Filed: May 13, 2011

(65) Prior Publication Data
US 2012/0290679 A1 Nov. 15, 2012

(51) Int. Cl.
G06F 15/16 (2006.01)
H04L 29/06 (2006.01)

(52) U.S. Cl.
CPC ................................ H04L 69/22 (2013.01)
USPC .......................... 709/217; 711/123; 711/126

(58) Field of Classification Search
CPC ..... G06F 15/16; G06F 21/10; G06F 21/6218; H04L 69/22; H04L 63/166; H04L 63/108; H04L 63/0428; H04L 9/32
USPC .................................. 709/217; 711/123, 126
See application file for complete search history.

(56) References Cited

U.S. PATENT DOCUMENTS

| 2002/0083178 | A1* | 6/2002 | Brothers | 709/226 |
| 2004/0259529 | A1* | 12/2004 | Suzuki | 455/411 |
| 2010/0293385 | A1* | 11/2010 | Nanda et al. | 713/176 |
| 2012/0089841 | A1* | 4/2012 | Boyer et al. | 713/175 |
| 2012/0089931 | A1 | 4/2012 | Steinhauer | |

\* cited by examiner

Primary Examiner — Oleg Survillo
Assistant Examiner — Mehulkumar Shah

(57) ABSTRACT

Various embodiments of systems and methods for REST interface interaction with expectation management are described herein. A message request is received for accessing content of a resource. Further, a check is made to determine whether the message request includes a structure-expected in a header of the message request. Also, a check is made to determine whether the structure-expected matches with a structure of the resource if the message request includes the structure-expected. Furthermore, the message request is executed if the structure-expected matches with the resource structure. Then, a message response is returned with a structure-resulted in a header of the message response based on the execution of the message request. If the message request does not include the structure-expected, the message request is executed and the message response is returned with the structure-resulted based on the execution of the message request.

18 Claims, 6 Drawing Sheets

REST INTERFACE INTERACTION WITH EXPECTATION MANAGEMENT

FIELD

Embodiments generally relate to computer systems and more particularly to methods and systems for providing representational state transfer (REST) interface interaction with expectation management.

BACKGROUND

Typically, representational state transfer (REST) interface is more widely used than other well defined interfaces such as Simple Object Access Protocol (SOAP), Remote Procedure Call (RPC), and the like, because of its simplicity. The REST interface includes just few instructions such as POST, PUT, DELETE and GET to perform different operations on contents of a resource, also known as a server system. Resource can be defined as a structured representation of data. However, the REST interface instructions (e.g., POST, PUT, DELETE and GET) do not clearly address an expected structure of the resource.

In existing methods, accessing the resource using a GET request has to be evaluated item by item in the resource to determine whether the request corresponds to the requested resource structure. Further, if the resource is handled as an Extensible Markup Language (XML) document, no instruction defines the permitted structure of the resource. Therefore, resource structure verification is an issue in the REST interface interaction as it would be required to obtain the entire resource in question to verify a successful execution of the request.

SUMMARY

Various embodiments of systems and methods for representational state transfer (REST) interface interaction with expectation management are described herein. In one aspect, a message request is received for accessing content of a resource. Further, a check is made to determine whether the message request includes a structure-expected in a header of the message request. Also, a check is made to determine whether the structure-expected matches with a structure of the resource if the message request includes the structure-expected. In a further aspect, the message request is executed if the structure-expected matches with the resource structure. In another aspect, a message response is returned with a structure-resulted in a header of the message response based on the execution of the message request. In yet another aspect, if the message request does not include the structure-expected, the message request is executed and the message response is returned with the structure-resulted based on the execution of the message request. In another aspect, if the structure-expected in the message request does not match with the structure of the resource, execution failure response is returned with the structure-resulted.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for providing representational state transfer (REST) interface interaction with expectation management are described herein. The REST interface provides interaction with a resource including simple instructions and is most commonly used in the Web system. According to one embodiment, the resource is a structured representation of data that may be addressed with a resource structure, commonly called as a server system. When a client system initiates requests to the server system, the server system processes the requests and returns appropriate responses. Requests and responses are built around the transfer of representations of resources. The client system can be desktop computers, work stations, laptop computers, hand held computers, smart phone, console devices or similar portable computing systems.

According to one embodiment, an additional field is introduced in headers of both message requests and message responses during the interaction between the client system and the server system to quickly identify structural mismatches between a structure-expected and an available resource structure. The structure-expected is used as a prerequisite and the message request is executed when the precondition is met. Therefore, introduction of the additional field in the headers of the message request and the message response increases development speed, detects and handles exceptional behavior in REST interface interactions between the client system and the server system.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
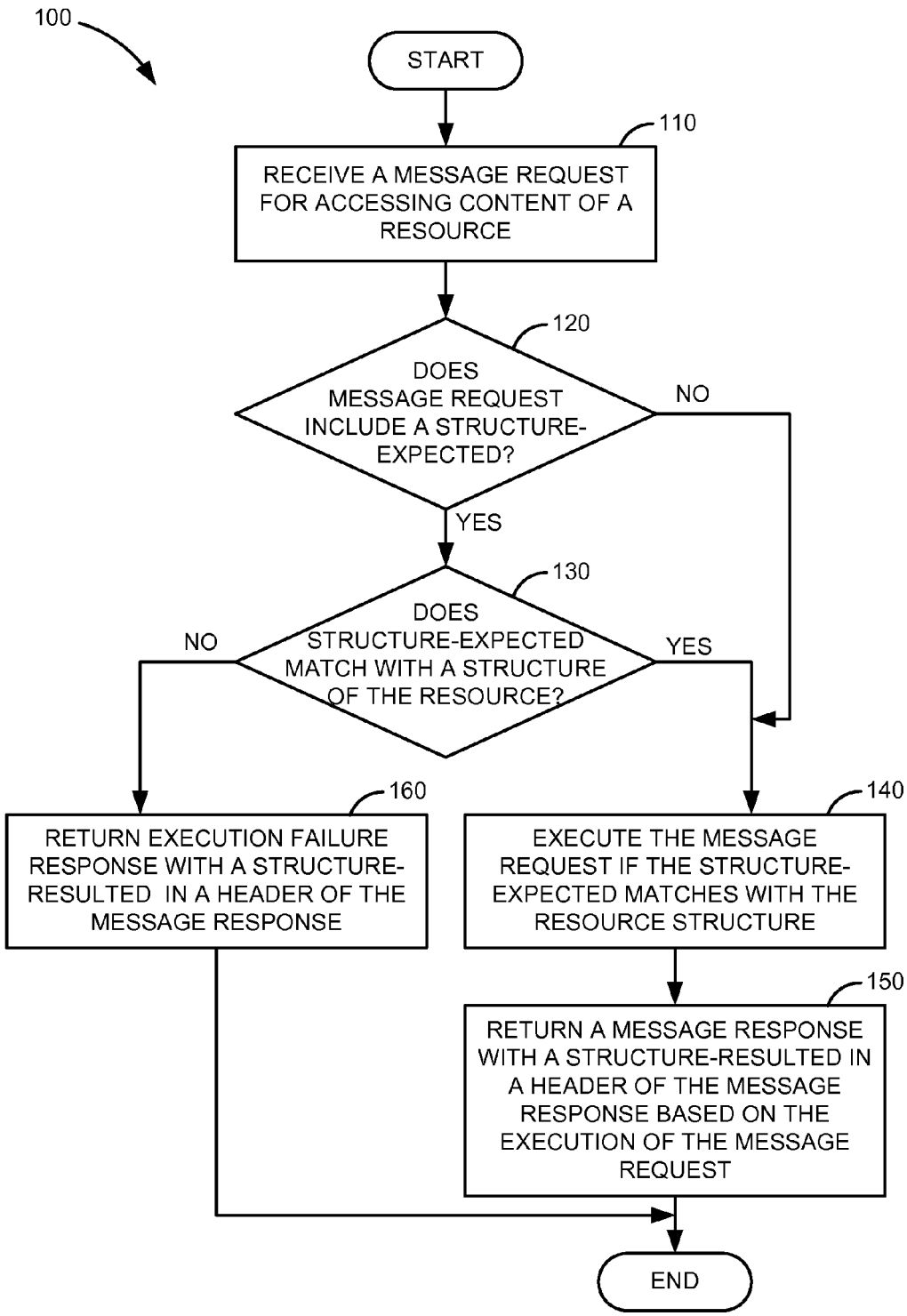
FIG. 1 is a flow diagram illustrating a method for providing interaction with expectation management, according to an embodiment.

FIG. 1 is a flow diagram 100 illustrating a method for providing interaction with expectation management, according to an embodiment. At step 110, a message request for accessing content of a resource is received. The message request can be a hypertext transfer protocol (HTTP) message. The HTTP message request envelope includes a header and a body. In one embodiment, the header of the message request can include a request type and a structure-expected. The request type includes a representational state transfer (REST) interface instruction type. For example, the REST web service instructions can be GET, to retrieve content of the resource or perform read-only query; PUT, to replace or update an existing content of the resource; POST, to create a new entry in the resource; and DELETE, to delete an entry from the resource. In one embodiment, the structure-expected includes a hash value computed using a hash function based on the message request. For example, if a request is made to apply for two days leave of absence, then the structure-expected includes the hash value representing available number of vacation days from which an employee can apply for leave of absence. The structure-expected can be of a format 'ed076287532e86365e841e92bfc50d8c;MD5'. The protocol structure of the message request is described in greater detail in FIG. 2.

At step 120, a check is made to determine whether the message request includes the structure-expected in a header of the message request. In one embodiment, the received message request may or may not include the structure-expected in the header of the message request. For example, the message request can include at least a request line such as 'GET/images/logo.pngHTTP/1.1 which requests a resource called '/images/logo.png', and a header such as 'accept-encoding:gzip, deflate', 'accept-charset:ISO-8859-1,utf-8; q=0.7,*;q=0.7' which describe additional information about the message request. Further, the header can include the structure-expected (e.g., the message request 'http://mathematics.com/resources/' does not include the structure-expected in the header. The message request 'http://mathematics.com/resources/ed076287532e86365e841e92bfc50d8c;MD5' includes the structure-expected, wherein 'ed076287532e86365e841e92bfc50d8c;MD5' is a hash value of the structure-expected, which is explained in detail in FIG. 2). Considering that the message request includes the structure-expected, step 130 is performed.

At step 130, a check is made to determine whether the structure-expected matches with a structure of the resource if the message request includes the structure-expected. The structure of the resource is represented by a hash value. Both the hash values of the structure-expected and the structure of the resource are compared. For example, if the structure-expected in the message request indicates five vacation days are available for the employee, a check is made to determine whether the available number of days matches with the number of days as indicated in the resource. Considering that the structure-expected and the resource structure matches step 140 is performed.

At step 140, the message request is executed if the structure-expected matches with the resource structure. In general, the message request is executed only if a hash value of the structure-expected matches with the hash value of the structure of the resource. At step 150, a message response is returned with a structure-resulted in a header of the message response based on the execution of the message request. The message response comprises a hypertext transfer protocol (HTTP) message including the header and a body.

In one embodiment, the header of the message response can include a response code and a structure-resulted. The response code contains a status code of the execution of the message request. For example, the status code such as '200-OK' indicates that the message request is successful, '201-CREATED' indicates that the message request is fulfilled and has resulted in a new resource content being created, '202 ACCEPTED' indicates that the message request is accepted for processing, '412-PRECONDITION FAILED' indicates that one or more of the request header fields evaluated to false when it was tested on the resource, and the like indicating the status of the execution of the message request. In one exemplary embodiment, the choice of the response code largely depends on the individual use cases (i.e., application). The structure-resulted comprises a hash value computed using a hash function based on the message response. For example, if a request for creating two days leave of absence is processed, the structure-resulted includes the hash value representing remaining available number of vacation days. The structure-resulted can be of a format 'ed076287532e86365e841e92bfc50e7d;MD5'. The protocol structure of the message request is described in greater detail in FIG. 3.

In one embodiment, if the message request does not include the structure-expected, the message request is executed and the message response is returned with the structure-resulted based on the execution of the message request, in steps 140 and 150. For example, the message request 'http://mathematics.com/resources/' does not include the structure-expected. In such a situation, the message request is executed and the message response is returned with the structure-resulted, thereby ensuring interoperability with existing HTTP message requests. The process is explained in detail with an example in FIG. 4.

In one embodiment, if the structure-expected in the message request does not match with the structure of the resource, execution failure response is returned with the structure-resulted, in step 160. For example, if the structure-expected in the message request indicates the number of available vacation days as five days, but the structure of the resource indicates the number of available vacation days as one day, then the request is not processed. Further, the available vacation days as indicated by the structure of the resource is returned along with the execution failure response. In general, the response header returns information on the current structure of the resource to the client system. Therefore, the execution of the message request can be easily verified on the client system using the structure-resulted. For example, the client system can verify the execution of the message request using a list of pre-calculated hash values, allowed for each stage of the interaction.

Figure 2:
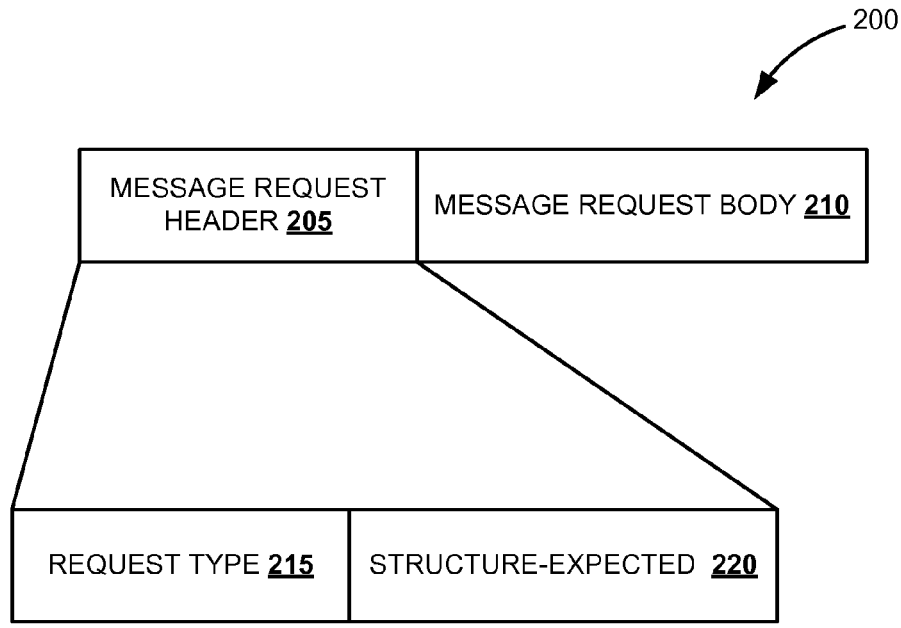
FIG. 2 is a block diagram illustrating a protocol structure of a message request, according to an embodiment.

FIG. 2 is a block diagram illustrating a protocol structure 200 of a message request, according to an embodiment. In one embodiment, the protocol structure 200 includes a header 205 and a body 210. In one embodiment, the header 205 is dynamically configured to include a request type 215 and a structure-expected 220. The request type 215 includes a representational state transfer (REST) interface instruction type such as GET, POST, PUT, and DELETE.

In one embodiment, the structure-expected 220 includes a hash value computed using a hash function based on the message request. The client system is configured to provide an input to the hash function to calculate the hash value depending on the application (i.e., type of the message request), and may or may not be directly linked to a resource for which the message request is sent. The basic pattern of the structure-expected 220 is '#hash;#name of hash algorithm'. The #hash can be computed using the hash algorithm indicated by #name of hash algorithm. The hash algorithm can be a MD5 (Message-Digest) Algorithm, SHA-2 (Secure Hash Algorithm), and the like. For example, the structure-expected 220 for "the quick brown fox jumps over the lazy dog" is '9e107d9d372bb6826bd81d3542a419d6;MD5', wherein '9e107d9d372bb6826bd81d3542a419d6' is the hash value and 'MD5' is the name of the hash algorithm. In one exemplary embodiment, the structure-expected 220 is computed based on the message request and sent along with the message request for accessing the resource. In another embodiment, a client system is configured to include the structure-expected 220. In other words, the structure-expected corresponding to the message request is known to the client system depending on a response message of a prior message request.

Figure 3:
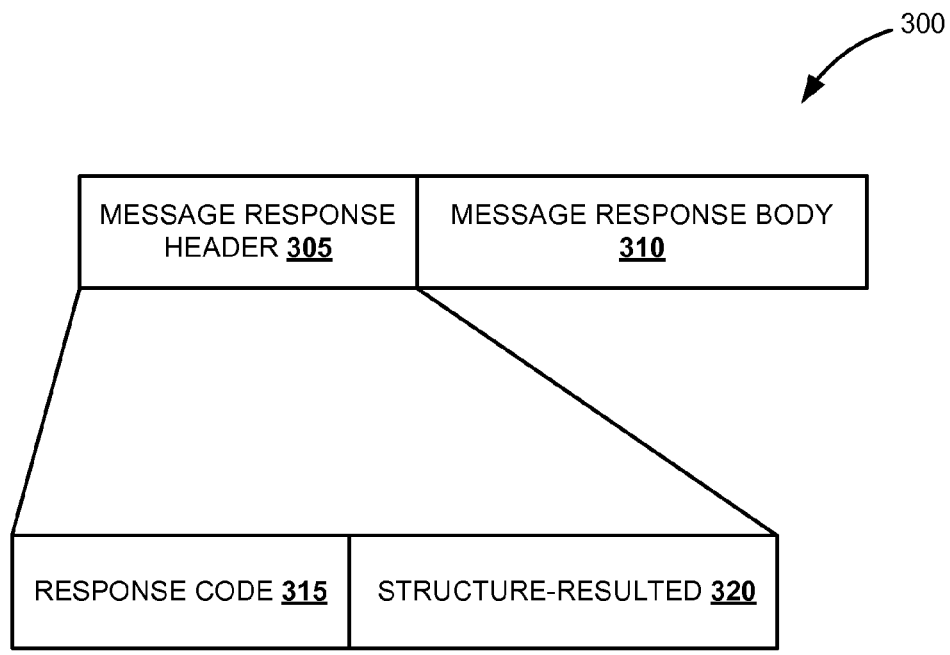
FIG. 3 is a block diagram illustrating a protocol structure of a message response, according to an embodiment.

FIG. 3 is a block diagram illustrating a protocol structure 300 of a message response, according to an embodiment. In one embodiment, the protocol structure 300 includes a header 305 and a body 310. In one embodiment, the header 305 is dynamically configured to include a response code 315 and a structure-resulted 320. The response code 315 contains a status code of the execution of the message request such as '200-OK', '201-CREATED', '202 ACCEPTED', '412-PRECONDITION FAILED', and the like.

In one embodiment, the structure-resulted 320 includes a hash value computed using a hash function based on the message response. The basic pattern of the structure-expected 320 is '#hash;#name of hash algorithm'. The #hash can be computed using the hash algorithm indicated by #name of hash algorithm. The hash algorithm can be a MD5 (Message-Digest) Algorithm, SHA-2 (Secure Hash Algorithm), and the like. For example, when a message request for retrieving the number of available vacation days for a calendar year is executed, the corresponding response such as number of available vacation days for the calendar year being five is obtained. The structure-resulted is computed for "the number of available vacation days for the calendar year is five" (for which the hash value is 9e108d8e372vv6827be92v3542b419z9;MD5, where '9e108d8e372vv6827be92v3542b419z9' is the hash value and 'MD5' is the name of the hash algorithm).

Figure 4:
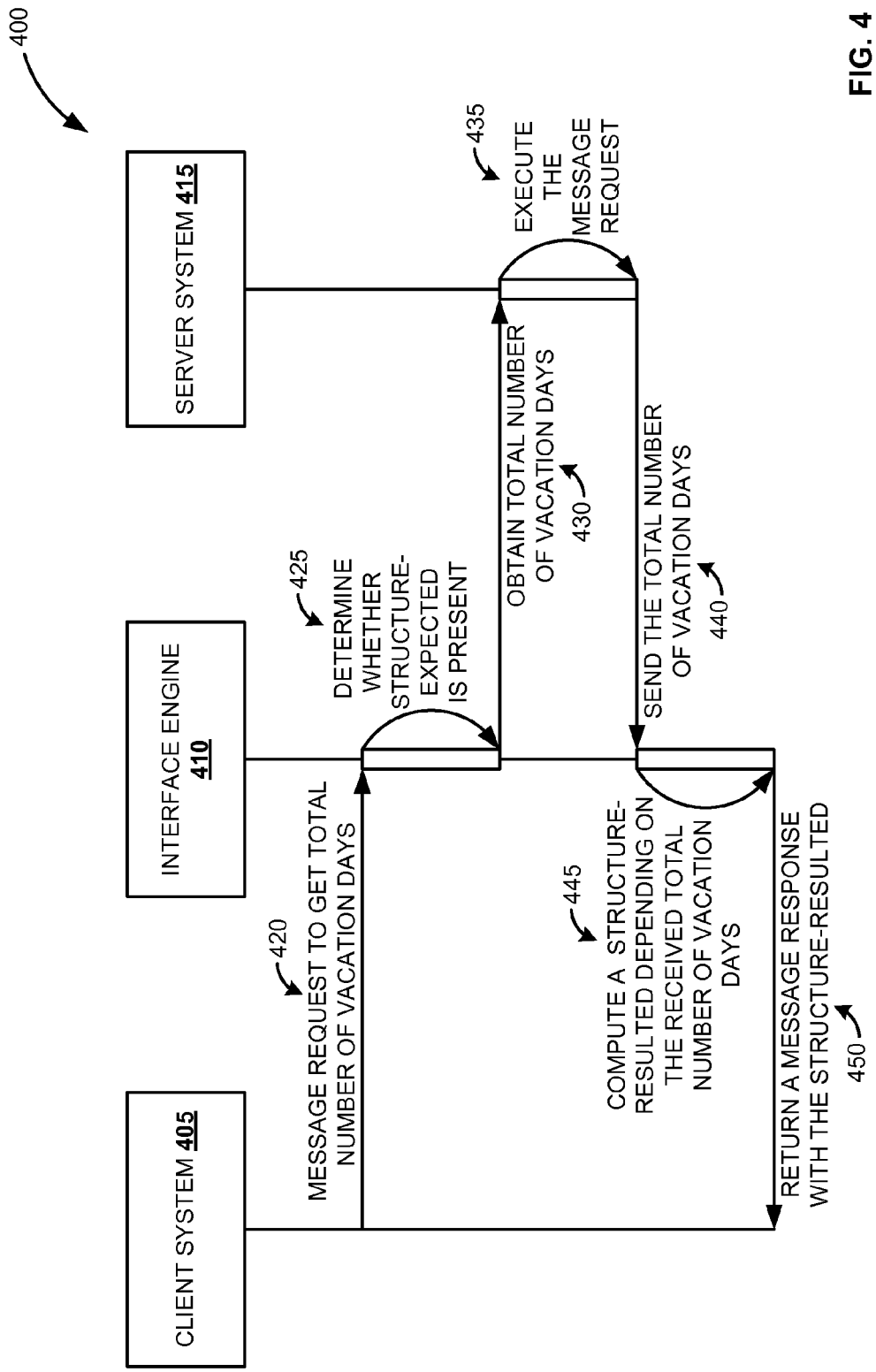
FIG. 4 is a sequence diagram illustrating an exemplary data flow of REST interaction with expectation management, according to an embodiment.

FIG. 4 is sequence diagram 400 illustrating an exemplary data flow of REST interaction with expectation management, according to an embodiment. The sequence diagram 400 represents all the interactions and the operations involved in the method for REST interaction with expectation management between a client system 405 and a server system 415, using an interface engine 410. FIG. 4 illustrates process objects including the client system 405, the interface engine 410 and the server system 415 along with their respective vertical lines originating from them. The vertical lines of the client system 405, the interface engine 410 and the server system 415 represent the processes that may exist simultaneously. The horizontal arrows (e.g., 420, 430, 440, and 450) represent the data flow steps between the vertical lines originating from their respective process objects (for e.g., the client system 405, the interface engine 410 and the server system 415). Activation boxes between the horizontal arrows represent the process that is being performed in the respective process object.

At step 420, the client system 405 sends a message request to get total number of vacation days. The message request includes a GET REST interface instruction and does not include a structure-expected. In response to the received request at the interface engine 410 (the interface engine 410 acts as an interface between the client system 405 and the server system 415), a check is made to determine whether the message request includes the structure-expected, in activation box 425. In the current example, the message request to get total number of vacation days does not include the structure-expected. At step 430, a request is made by the interface engine 410 to execute the message request (e.g., to obtain the total number of vacation days) to the server system 415. Further, the server system 415 executes the message request, in activation box 435 and sends the total number of vacation days to the interface engine 410, in step 440 (e.g., total number of vacation days as five days).

Further in process, the interface engine 410 computes a structure-resulted depending on the received total number of vacation days, in activation box 445. In one exemplary embodiment, the interface engine 410 is configured to calculate the structure-resulted based on the number of vacation days. The structure-resulted includes a hash value for the 'five total number of vacation days'. At step 450, a message response along with the structure-resulted is returned to the client system 405 (i.e., 'the total number of vacation days as five days and the corresponding hash value are returned to the client system 405).

Figure 5:
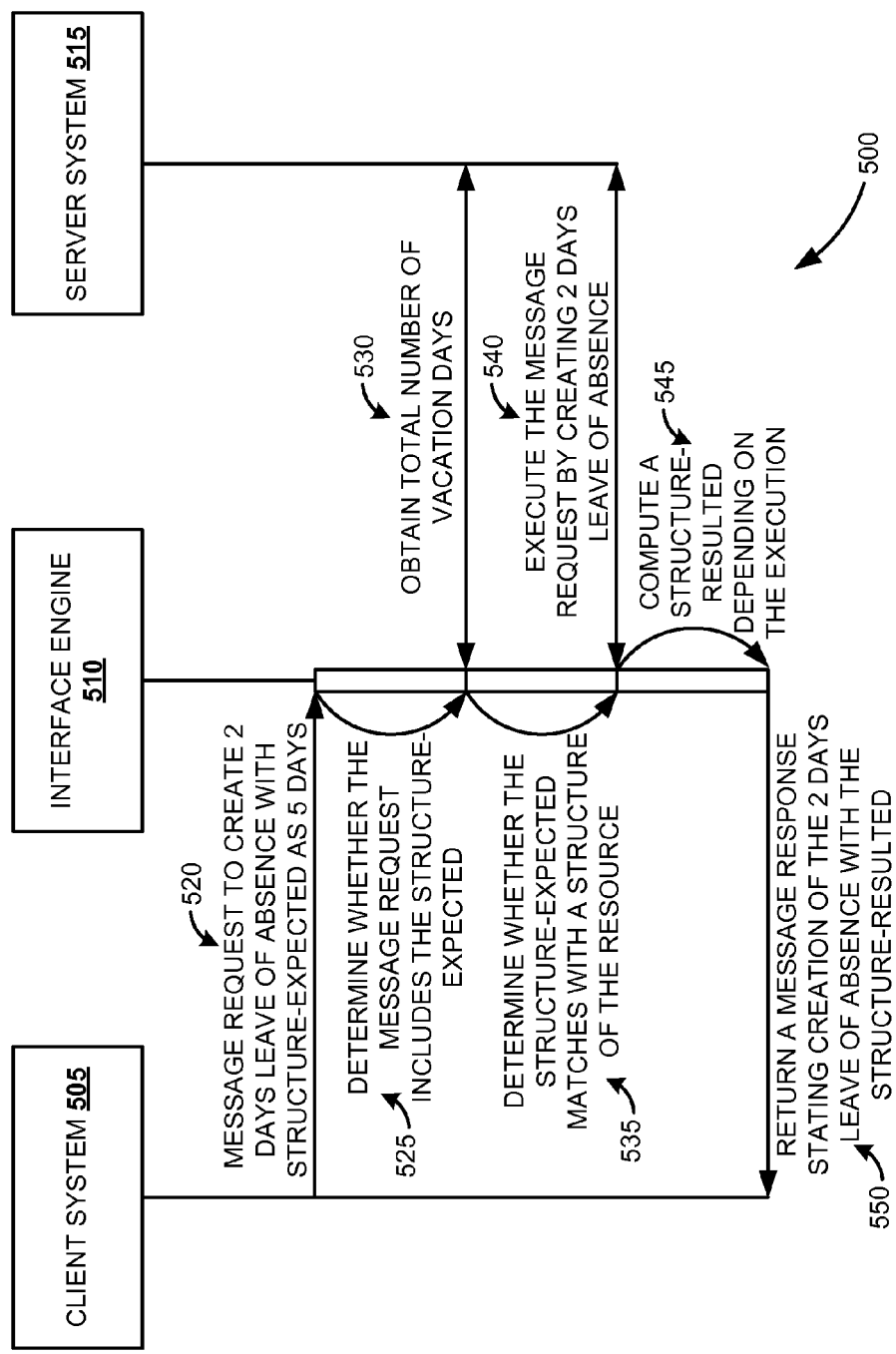
FIG. 5 is a sequence diagram illustrating another exemplary data flow of REST interaction with expectation management, according to an embodiment.

FIG. 5 is sequence diagram 500 illustrating another exemplary data flow of REST interaction with expectation management, according to an embodiment. The sequence diagram 500 represent all the interactions and the operations involved in the method for REST interaction with expectation management between a client system 505 and a server system 515, using an interface engine 510. FIG. 5 illustrates process objects including the client system 505, the interface engine 510 and the server system 515 along with their respective vertical lines originating from them. The vertical lines of the client system 505, the interface engine 510 and the server system 515 represent the processes that may exist simultaneously. The horizontal arrows (e.g., 520, 530, 540, and 550) represent the data flow steps between the vertical lines originating from their respective process objects (for e.g., the client system 505, the interface engine 510 and the server system 515). Activation boxes between the horizontal arrows represent the process that is being performed in the respective process object.

At step 520, the client system 505 sends a message request to create two days leave of absence. The message request includes a POST REST interface instruction and includes a structure-expected of five days available vacation days. In response to the received request at the interface engine 510 (the interface engine 510 acts as an interface between the client system 505 and the server system 515), a check is made to determine whether the message request includes the structure-expected, in activation box 525. In the current example, the message request to create two days leave of absence includes the structure-expected (e.g., five days available vacation days). At step 530, to check the validity of the structure-expected, a structure of the resource is retrieved, i.e., the total number of available vacation days is obtained from the server system 515 (e.g., the structure of the resource results in the number of available vacation days as five days). Further, a check is made to determine whether the structure-expected matches with the structure of the resource, in activation box 535. In the current example, both the structure-expected and the structure of the resource match. Thereby, the message request to create two days leave of absence is executed, in step 540.

Further in process, the interface engine 510 computes a structure-resulted depending on the execution of the message request, in activation box 545. For example, of the total number of vacation days (e.g., five days), two days leave of absence is created. Therefore, the remaining number of vacation days is three days. At step 550, a message response along with a structure-resulted is returned to the client system 505 stating creation of the two days leave of absence. The message response includes a response code '201-CREATED'. The structure-resulted includes a hash value for the 'total number of vacation days as three days'.

Figure 6:
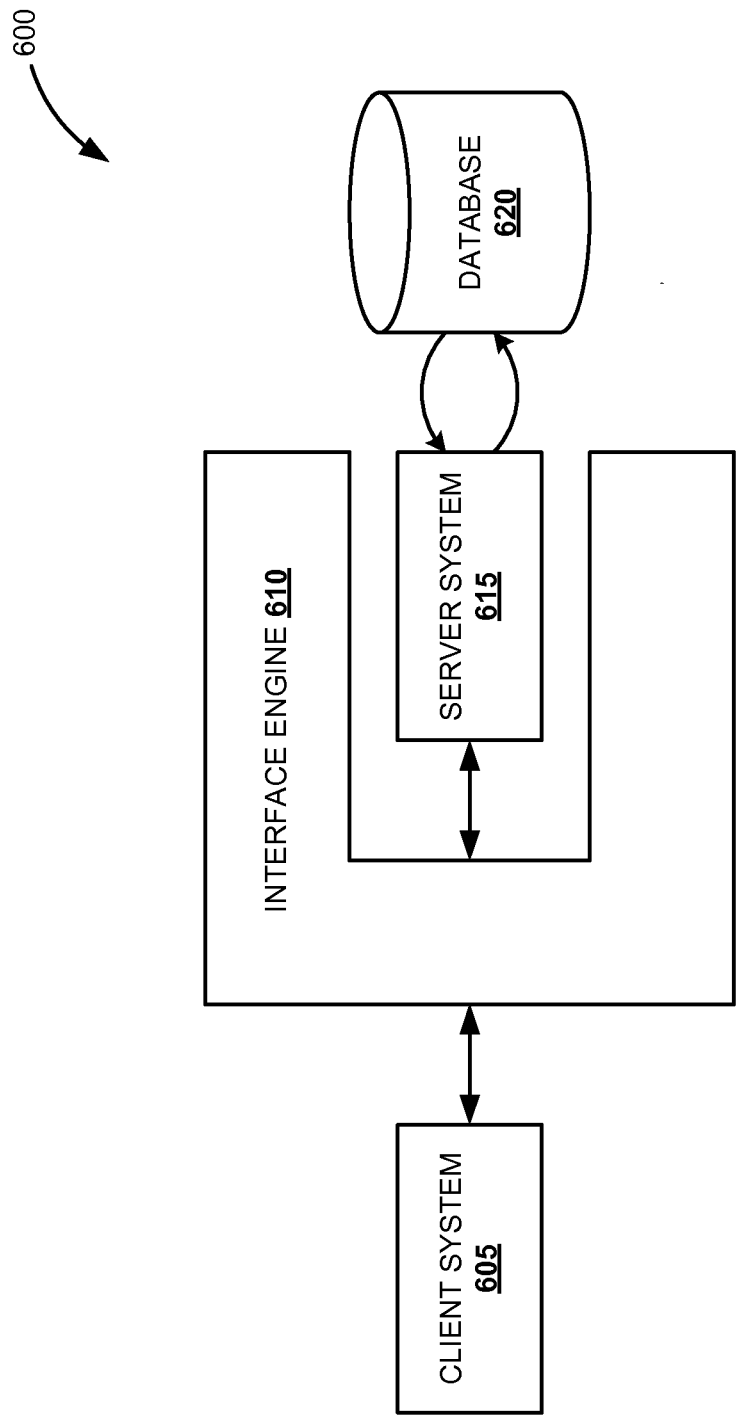
FIG. 6 is a block diagram illustrating an interaction system for providing interaction with expectation management, according to an embodiment.

FIG. 6 is a block diagram 600 illustrating an interaction system for providing interaction with expectation management, according to an embodiment. The interaction system includes a client system 605, the interface engine 610 and the server system 615. The client system 605 and the server system 615 are communicatively coupled through the interface engine 610. In one embodiment, the client system 605 is configured to send a message request for accessing content of a resource and to receive a message response with a structure-resulted in a header of the message response based on the execution of the message request. In one embodiment, the client system 605 is configured to include the structure-expected.

In one embodiment, the interface engine 610 is configured to determine whether the message request includes a structure-expected in a header of the message request and determine whether the structure-expected matches with a structure of the resource if the message request includes the structure-expected. Further, the interface engine 610 is also configured to execute the message request if the structure-expected matches with the resource structure by communicating to the server system 615. In one exemplary embodiment, the server system 615 includes the resource. Furthermore, the interface engine 610 can return a message response with a structure-resulted in a header of the message response based on the execution of the message request. In other words, the interface engine 610 is configured to compute the structure-resulted.

Further, if the message request does not include the structure-expected, the interface engine 610 is configured to execute the message request and return the message response with the structure-resulted based on the execution of the message request. Furthermore, if the structure-expected in the message request does not match with the structure of the resource, the interface engine 610 is further configured to return execution failure response with the structure-resulted.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
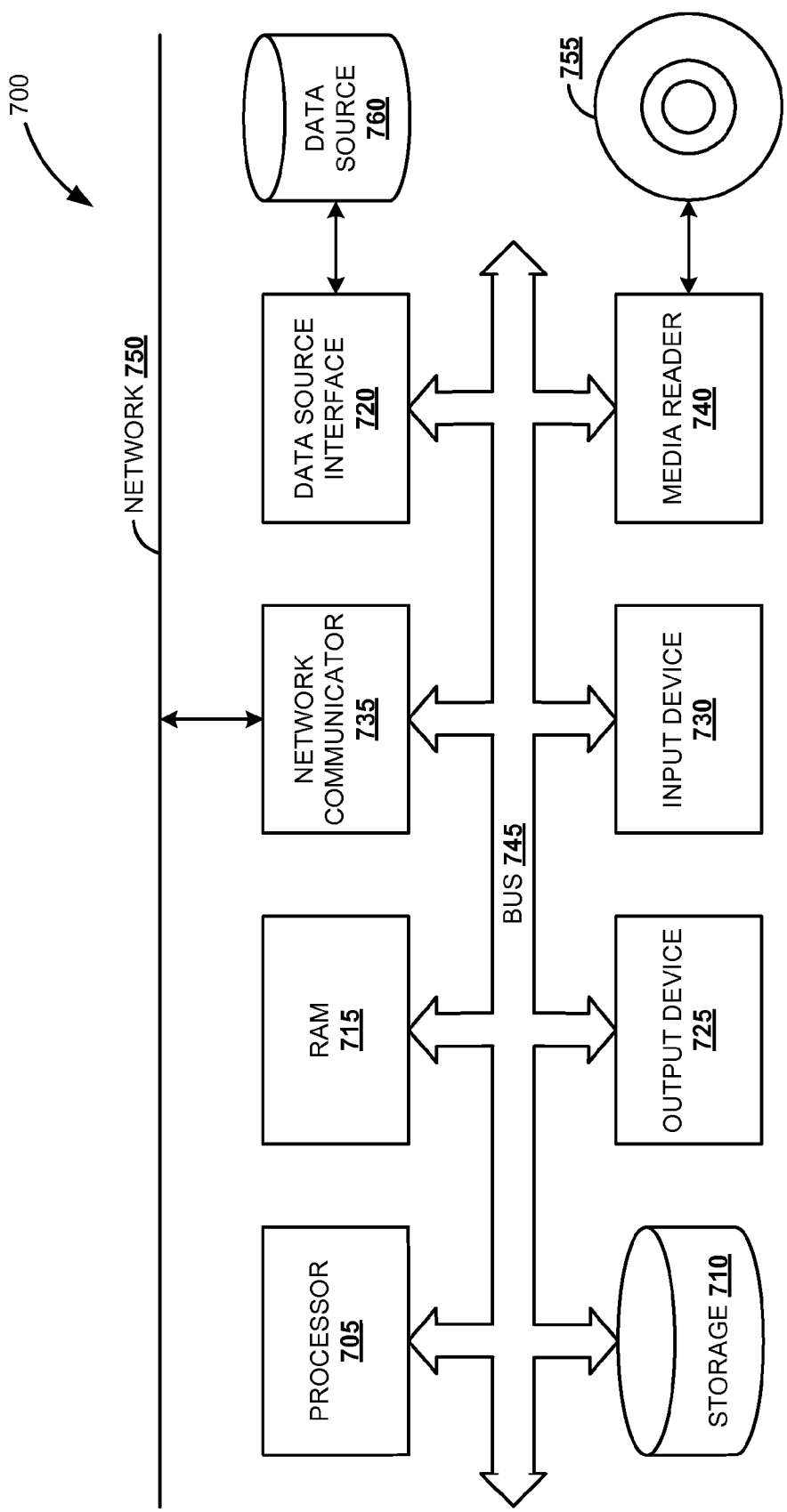
FIG. 7 is a block diagram illustrating a computing environment in which the techniques described for providing interaction with expectation management, according to an embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for providing a representational state transfer (REST) interface interaction with expectation management, the method comprising:
    receiving a message request at an interface engine from a client system, requesting to perform an action on a resource at a server system, wherein the interface engine acts as an interface between the client system and the server system;
    determining at the interface engine whether the message request includes a structure-expected in a header of the message request, wherein the structure-expected comprises a first hash value computed using a first hash function based on the message request;
    upon determining that the message request includes the structure-expected, retrieving a structure of the resource from the server system to the interface engine;
    determining at the interface engine whether the structure-expected matches the retrieved structure of the resource;
    upon determining that the structure-expected matches the retrieved structure of the resource,
        sending the message request for execution at the server system;
        receiving an executed execution of the message request at the interface engine; and
        computing at the interface engine a structure-resulted including a second hash value based on the received execution of the executed message request, wherein the second hash value is computed using a second hash function;
    upon determining that the structure-expected in the message request does not match with the retrieved structure of the resource, returning execution failure response with the structure-resulted;
    upon determining that the message request does not include a structure-expected,
        sending the message request for execution at the server system;
        receiving an executed message request at the interface engine; and
        computing at the interface engine a structure-resulted including a third hash value based on the received executed message request, wherein the third hash value is computed using the second hash function; and
    returning, from the interface engine to the client system, a message response with the structure-resulted in a header of the message response based on the received executed execution of the message request.

2. The computer implemented method of claim 1, wherein when the message request does not include the structure-expected, the method further comprises executing the message request and returning the message response with the structure-resulted based on the execution of the message request.

3. The computer implemented method of claim 1, wherein the message request comprises a hypertext transfer protocol (HTTP) message including the header and a body.

4. The computer implemented method of claim 3, wherein the header of the message request comprises a request type including a representational state transfer (REST) interface instruction.

5. The computer implemented method of claim 1, wherein the message response comprises a hypertext transfer protocol (HTTP) message including the header and a body.

6. The computer implemented method of claim 1, further comprising:
    returning information on a current structure of the resource in the message response from the interface engine to the client system; and
    based on the returned message response, enabling verification of the execution of the message request by the client system using a list of pre-calculated hash values allowed.

7. An interaction system for providing a representational state transfer (REST) interface interaction with expectation management, the interaction system comprising:
    a computer memory storing program code; and
    a processor configured to execute the program code to:
        receive a message request at an interface engine from a client system, requesting to perform an action on a resource at a server system, wherein the interface engine acts as an interface between the client system and the server system;

determine at the interface engine whether the message request includes a structure-expected in a header of the message request, wherein the structure-expected comprises a first hash value computed using a first hash function based on the message request;

upon determining that the message request includes the structure-expected, retrieve a structure of the resource from the server system to the interface engine;

determine at the interface engine whether the structure-expected matches the retrieved structure of the resource;

upon determining that the structure-expected matches the retrieved structure of the resource,
send the message request for execution at the server system;
receive the executed execution of the message request at the interface engine; and
compute at the interface engine a structure-resulted including a second hash value based on the received executed execution of the message request, wherein the second hash value is computed using a second hash function;

upon determining that the structure-expected in the message request does not match with the retrieved structure of the resource, return execution failure response with the structure-resulted;

upon determining that the message request does not include a structure-expected,
send the message request for execution at the server system;
receive the executed message request at the interface engine; and
compute at the interface engine a structure-resulted including a third hash value based on the received executed message request, wherein the third hash value is computed using the second hash function; and
return, from the interface engine to the client system, a message response with the structure-resulted in a header of the message response based on the received executed execution of the message request.

8. The interaction system of claim 7, wherein when the message request does not include the structure-expected, the program code further comprises program code to:
execute the message request and return the message response with the structure-resulted based on the execution of the message request.

9. The interaction system of claim 7, wherein when the message request does not include the structure-expected, the program code further comprises program code to:
returning information on a current structure of the resource in the message response from the interface engine to the client system; and
based on the returned message response, enabling verification of the execution of the message request by the client system using a list of pre-calculated hash values allowed.

10. The interaction system of claim 7, wherein the message request comprises a hypertext transfer protocol (HTTP) message including the header and a body.

11. The interaction system of claim 10, wherein the header of the message request comprises a request type including a representational state transfer (REST) interface instruction.

12. The interaction system of claim 7, wherein the message response comprises a hypertext transfer protocol (HTTP) message including the header and a body.

13. An article of manufacture including a non-transitory computer readable storage medium physically storing instructions, which when executed by a computer, cause the computer to:
receive a message request at an interface engine from a client system, requesting to perform an action on a resource at a server system, wherein the interface engine acts as an interface between the client system and the server system;
determine at the interface engine whether the message request includes a structure-expected in a header of the message request, wherein the structure-expected comprises a first hash value computed using a first hash function based on the message request;
upon determining that the message request includes the structure-expected, retrieve a structure of the resource from the server system to the interface engine;
determine at the interface engine whether the structure-expected matches the retrieved structure of the resource;
upon determining that the structure-expected matches the retrieved structure of the resource,
send the message request for execution at the server system;
receive an executed execution of the message request at the interface engine; and
compute at the interface engine a structure-resulted including a second hash value based on the received executed execution of the message request, wherein the second hash value is computed using a second hash function;
upon determining that the structure-expected in the message request does not match with the retrieved structure of the resource, return execution failure response with the structure-resulted;
upon determining that the message request does not include a structure-expected,
send the message request for execution at the server system;
receive an executed message request at the interface engine; and
compute at the interface engine a structure-resulted including a third hash value based on the received executed message request, wherein the third hash value is computed using the second hash function; and
return, from the interface engine to the client system, a message response with the structure-resulted in a header of the message response based on the received executed execution of the message request.

14. The article of manufacture of claim 13, wherein when the message request does not include the structure-expected, the instructions further cause the computer to execute the message request and return the message response with the structure-resulted based on the execution of the message request.

15. The article of manufacture of claim 13, wherein the message request comprises a hypertext transfer protocol (HTTP) message including the header and a body.

16. The article of manufacture of claim 15, wherein the header of the message request comprises a request type including a representational state transfer (REST) interface instruction.

17. The article of manufacture of claim 13, wherein the message response comprises a hypertext transfer protocol (HTTP) message including the header and a body.

18. The article of manufacture of claim 13, further comprises instructions which when executed by the computer cause the computer to:
- return information on a current structure of the resource in the message response from the interface engine to the client system; and
- based on the returned message response, enable verification of the execution of the message request by the client system using a list of pre-calculated hash values allowed.

* * * * *